(12) United States Patent
Lai et al.

(10) Patent No.: US 11,243,369 B2
(45) Date of Patent: Feb. 8, 2022

(54) ELECTRONIC DEVICE AND LENS MODULE AND SWITCH MEMBER THEREOF

(71) Applicant: Wistron Corp., New Taipei (TW)

(72) Inventors: Hsu Lung Lai, New Taipei (TW); Pi Yun Lee, New Taipei (TW)

(73) Assignee: WISTRON CORP., New Taipei (TW)

(*) Notice: Subject to any disclaimer, the term of this patent is extended or adjusted under 35 U.S.C. 154(b) by 535 days.

(21) Appl. No.: 16/218,273

(22) Filed: Dec. 12, 2018

(65) Prior Publication Data
US 2020/0073073 A1    Mar. 5, 2020

(30) Foreign Application Priority Data

Aug. 29, 2018 (TW) ................................ 107211766

(51) Int. Cl.
| | |
|---|---|
| G02B 7/02 | (2021.01) |
| G02B 15/14 | (2006.01) |
| G03B 17/00 | (2021.01) |
| G06F 1/16 | (2006.01) |
| G02B 5/20 | (2006.01) |
| G02B 13/00 | (2006.01) |

(52) U.S. Cl.
CPC .............. G02B 7/02 (2013.01); G02B 5/20 (2013.01); G02B 13/001 (2013.01); G06F 1/1686 (2013.01)

(58) Field of Classification Search
CPC ........ G02B 7/10; G02B 25/002; G02B 7/021; G02B 7/02; G02B 7/023; G03B 17/14; G03B 17/02; G03B 17/00

USPC ................ 359/811–830, 704, 808–809, 703; 396/529, 532, 535, 542, 531, 543

See application file for complete search history.

(56) References Cited

U.S. PATENT DOCUMENTS

| | | | | |
|---|---|---|---|---|
| 3,308,734 A | * | 3/1967 | Spiessl ..................... | G03B 9/07 396/460 |
| 6,006,040 A | * | 12/1999 | Aosaki ..................... | G03B 9/62 396/242 |
| 8,164,813 B1 | * | 4/2012 | Gat .......................... | G03B 9/06 359/230 |

(Continued)

FOREIGN PATENT DOCUMENTS

| | | |
|---|---|---|
| TW | M304052 U | 1/2007 |
| TW | 200813599 A | 3/2008 |
| TW | 200928540 A | 7/2009 |

*Primary Examiner* — Dawayne Pinkney

(57) ABSTRACT

A switch member is provided. The switch member includes a mounting board, a moveable plate, a first blade and a second blade. The mounting board includes a mounting board opening. The moveable plate is slidably connected to the mounting board, wherein the moveable plate includes a moveable plate opening, and the moveable plate further includes a first moveable plate abutting portion and a second moveable plate abutting portion. The first blade includes a first blade pivoting portion, a first blade abutting portion and a first blade covering portion, wherein the first blade pivoting portion is located between the first blade abutting portion and the first blade covering portion. The second blade includes a second blade pivoting portion, a second blade abutting portion and a second blade covering portion, wherein the second blade abutting portion is located between the second blade pivoting portion and the second blade covering portion.

20 Claims, 9 Drawing Sheets

(56) References Cited

U.S. PATENT DOCUMENTS

2004/0042092 A1\* 3/2004 Nomura .................. G02B 7/08
                                                    359/819
2007/0217783 A1\* 9/2007 Nishijima .............. G03B 17/04
                                                    396/448

\* cited by examiner

ELECTRONIC DEVICE AND LENS MODULE AND SWITCH MEMBER THEREOF

CROSS REFERENCE TO RELATED APPLICATIONS

This Application claims priority of Taiwan Patent Application No. 107211766, filed on Aug. 29, 2018, the entirety of which is incorporated by reference herein.

BACKGROUND OF THE INVENTION

Field of the Invention

The present invention relates to an electronic device, and in particular to an electronic device with a lens module.

Description of the Related Art

Conventional electronic devices such as mobile phones and tablet computers have size requirements mandating that they be slim, and due to these size requirements there is no switch member disposed in front of the photographic lens built into the mobile phone or tablet computer. Therefore, the photographic lens of a mobile phone or a tablet computer may easily become damaged by external pollution. Additionally, the photographic lens of a mobile phone or tablet computer must always be uncovered, and the user's privacy may be violated by malicious programs.

Conventionally, there are switch members for digital cameras. However, the size and operational space requirements of a conventional switch member are too large. The conventional switch member thus cannot be utilized in a slim mobile phone or tablet computer.

BRIEF SUMMARY OF THE INVENTION

In one embodiment, a lens module is provided. The lens module includes a substrate, a lens, a mounting board, a moveable plate, a first blade and a second blade. The lens is disposed on the substrate. The mounting board is disposed on the substrate. The mounting board comprises a mounting board opening, and the lens corresponds to the mounting board opening. The moveable plate is slidably connected to the mounting board. The moveable plate comprises a moveable plate opening, the moveable plate opening corresponds to the lens, and the moveable plate further comprises a first moveable plate abutting portion and a second moveable plate abutting portion. The first blade comprises a first blade pivoting portion, a first blade abutting portion and a first blade covering portion. The first blade covering portion is adapted to cover the lens, the first blade pivoting portion is located between the first blade abutting portion and the first blade covering portion, the first blade pivoting portion pivots on the mounting board, and the first moveable plate abutting portion abuts the first blade abutting portion. The second blade comprises a second blade pivoting portion, a second blade abutting portion and a second blade covering portion. The second blade covering portion is adapted to cover the lens, the second blade abutting portion is located between the second blade pivoting portion and the second blade covering portion, the second blade pivoting portion pivots on the mounting board, and the second moveable plate abutting portion abuts the second blade abutting portion.

In one embodiment, an electronic device is provided. The electronic device includes a device housing, a lens, a mounting board, a moveable plate, a first blade and a second blade. The lens is disposed on the device housing. The mounting board is disposed on the device housing, wherein the mounting board comprises a mounting board opening, and the lens corresponds to the mounting board opening. The moveable plate is slidably connected to the mounting board, wherein the moveable plate comprises a moveable plate opening, the moveable plate opening corresponds to the lens, and the moveable plate further comprises a first moveable plate abutting portion and a second moveable plate abutting portion. The first blade comprises a first blade pivoting portion, a first blade abutting portion and a first blade covering portion, wherein the first blade covering portion is adapted to cover the lens, the first blade pivoting portion is located between the first blade abutting portion and the first blade covering portion, the first blade pivoting portion pivots on the mounting board, and the first moveable plate abutting portion abuts the first blade abutting portion. The second blade comprises a second blade pivoting portion, a second blade abutting portion and a second blade covering portion, wherein the second blade covering portion is adapted to cover the lens, the second blade abutting portion is located between the second blade pivoting portion and the second blade covering portion, the second blade pivoting portion pivots on the mounting board, and the second moveable plate abutting portion abuts the second blade abutting portion.

In one embodiment, a switch member is provided. The switch member includes a mounting board, a moveable plate, a first blade and a second blade. The mounting board comprises a mounting board opening. The moveable plate is slidably connected to the mounting board, wherein the moveable plate comprises a moveable plate opening, and the moveable plate further comprises a first moveable plate abutting portion and a second moveable plate abutting portion. The first blade comprises a first blade pivoting portion, a first blade abutting portion and a first blade covering portion, wherein the first blade covering portion is adapted to cover the mounting board opening and the moveable plate opening, the first blade pivoting portion is located between the first blade abutting portion and the first blade covering portion, the first blade pivoting portion pivots on the mounting board, and the first moveable plate abutting portion abuts the first blade abutting portion. The second blade comprises a second blade pivoting portion, a second blade abutting portion and a second blade covering portion, wherein the second blade covering portion is adapted to cover the mounting board opening and the moveable plate opening, the second blade abutting portion is located between the second blade pivoting portion and the second blade covering portion, the second blade pivoting portion pivots on the mounting board, and the second moveable plate abutting portion abuts the second blade abutting portion.

Utilizing the embodiment of the invention, the moveable plate is capable to be moved along the straight path to switch the electronic device between the covered state and the uncovered state because the first blade pivoting portion is located between the first blade abutting portion and the first blade covering portion, and the second blade abutting portion is located between the second blade pivoting portion and the second blade covering portion. The structure of the lens module of the embodiment of the invention is simplified, and the inner space in the electronic device is increased. Additionally, the lens module of the embodiment can be switched between the covered state and the uncovered state within small operation space, and is not interfered with by other elements.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
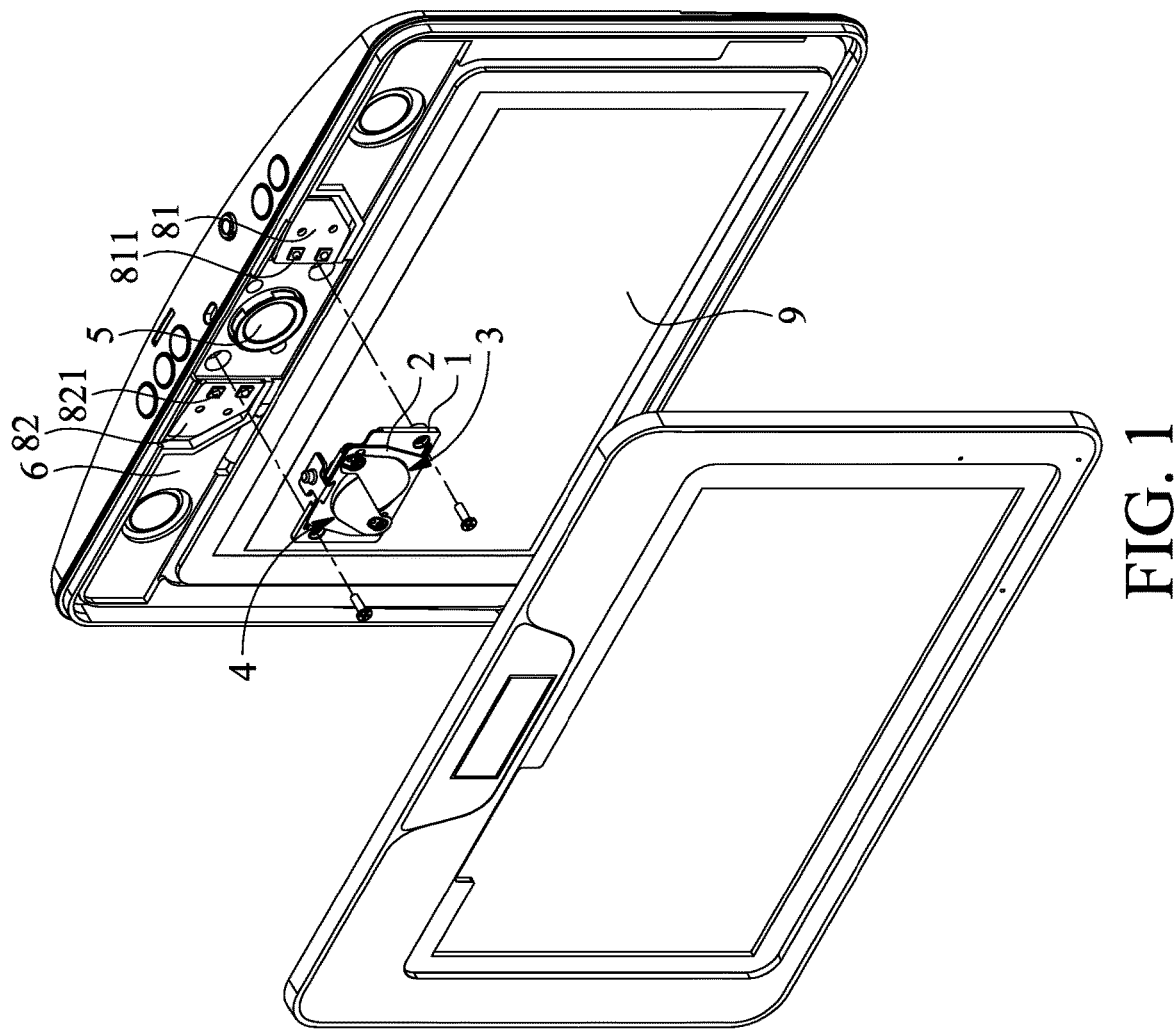
FIG. 1 is an exploded view of an electronic device of an embodiment of the invention.

FIG. 1 shows an electronic device E of an embodiment of the invention. In this embodiment, the electronic device E can be a tablet device or a part of a robot. The electronic device E includes a device housing 6, a lens 5, a mounting board 1, a moveable plate 2, a first blade 3 and a second blade 4. In different embodiments, the device housing 6 can be replaced by a substrate. The lens 5 is disposed on the device housing 6. The mounting board 1 is disposed on the device housing 6. The moveable plate 2 is slidably connected to the mounting board 1.

Figure 2A:
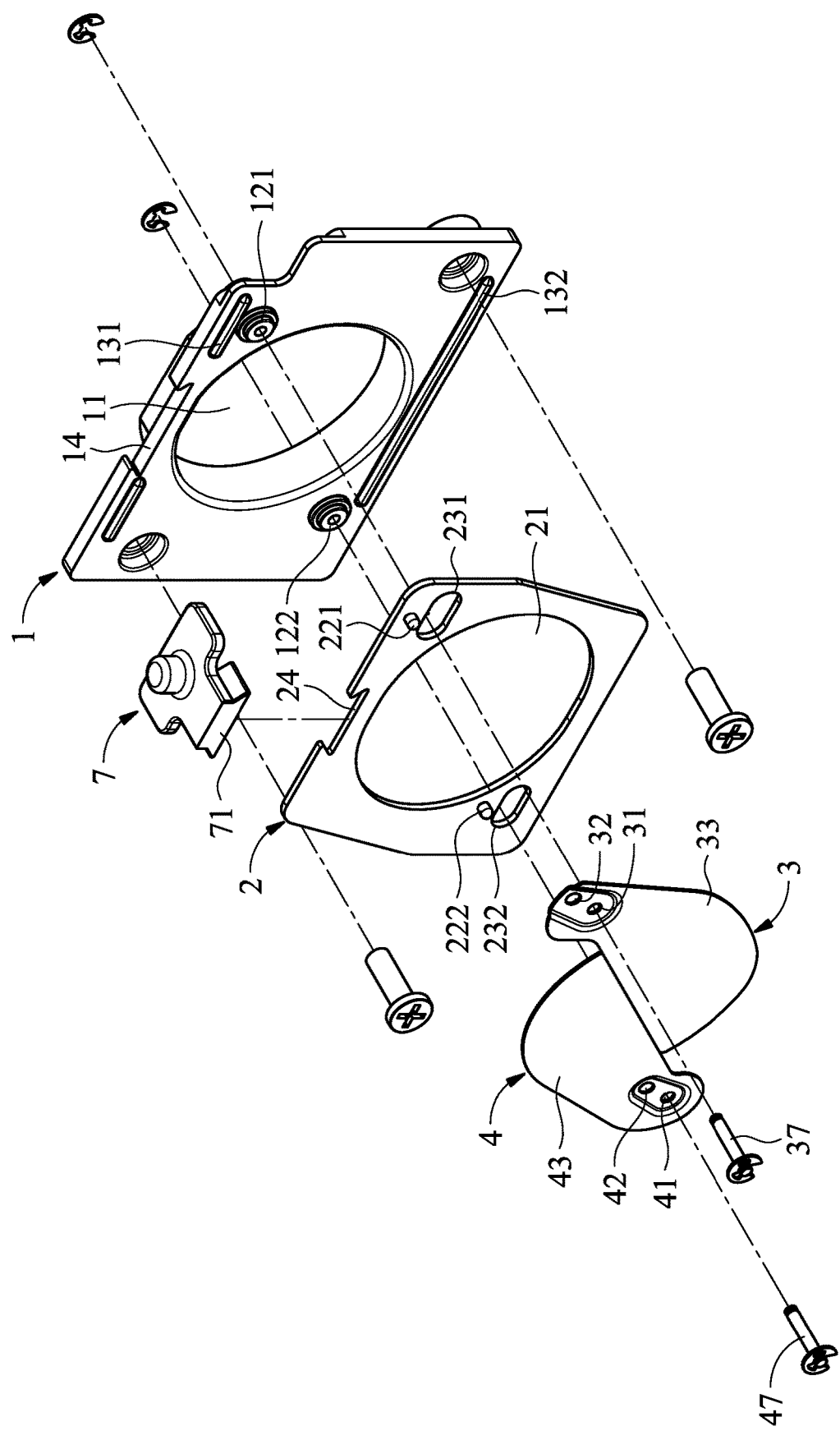
FIG. 2A is an exploded view of a switch member of an embodiment of the invention.

FIG. 2A is an exploded view of a switch member of an embodiment of the invention. The switch member includes the mounting board 1, the moveable plate 2, the first blade 3 and the second blade 4. With reference to FIGS. 1 and 2A, the mounting board 1 comprises a mounting board opening 11. The lens 5 corresponds to the mounting board opening 11. The moveable plate 2 comprises a moveable plate opening 21, and the moveable plate opening 21 corresponds to the lens 5. The moveable plate 2 further comprises a first moveable plate abutting portion 221 and a second moveable plate abutting portion 222. The first blade 3 comprises a first blade pivoting portion 31, a first blade abutting portion 32 and a first blade covering portion 33. The first blade covering portion 33 is adapted to cover the lens. The first blade pivoting portion 31 is located between the first blade abutting portion 32 and the first blade covering portion 33. The first blade pivoting portion 31 pivots on the mounting board 1. The first moveable plate abutting portion 221 abuts the first blade abutting portion 32. The second blade 4 comprises a second blade pivoting portion 41, a second blade abutting portion 42 and a second blade covering portion 43. The second blade covering portion 43 is adapted to cover the lens. The second blade abutting portion 42 is located between the second blade pivoting portion 41 and the second blade covering portion 43. The second blade pivoting portion 41 pivots on the mounting board 1. The second moveable plate abutting portion 222 abuts the second blade abutting portion 42.

In one embodiment, the electronic device E comprises a lens module. The lens module includes the lens 5, the mounting board 1, the moveable plate 2, the first blade 3 and the second blade 4.

Figure 3A:
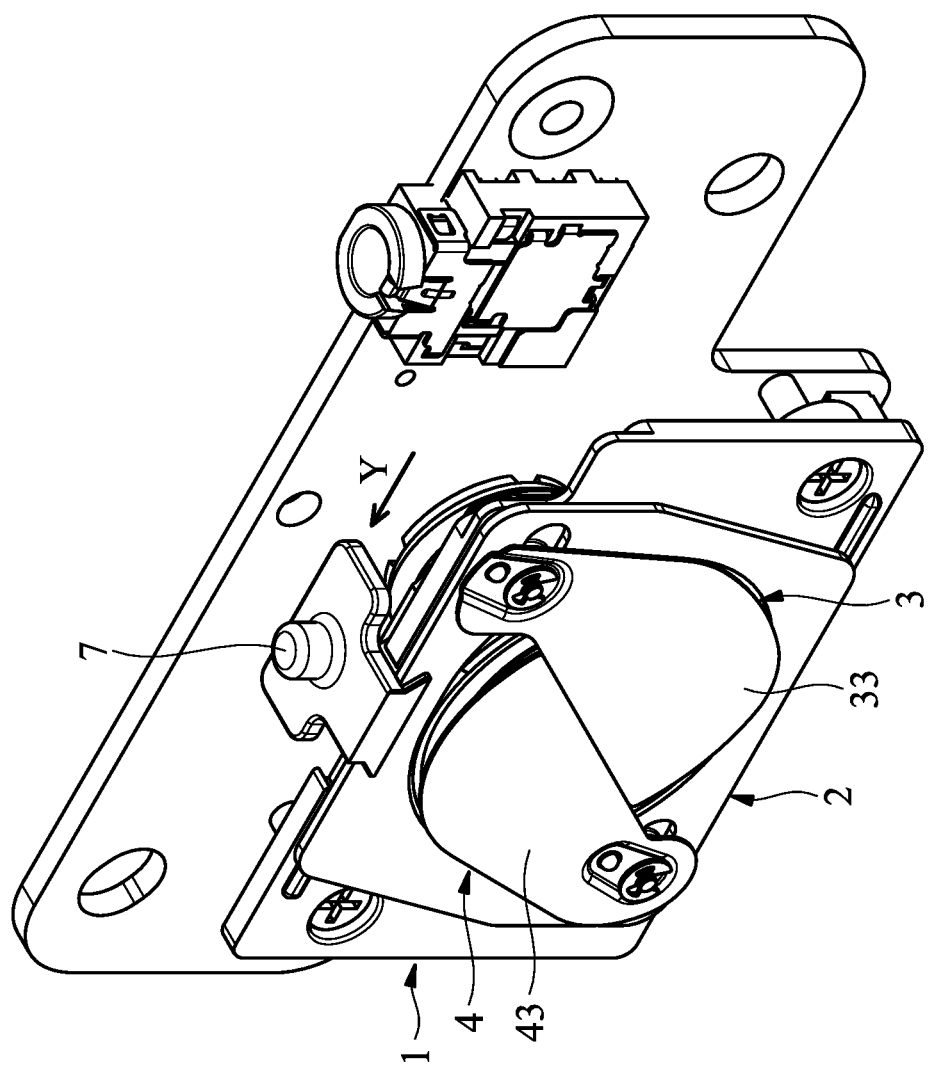
FIG. 3A shows a lens module of an embodiment of the invention, wherein the switch member is in a covered state.
Figure 3B:
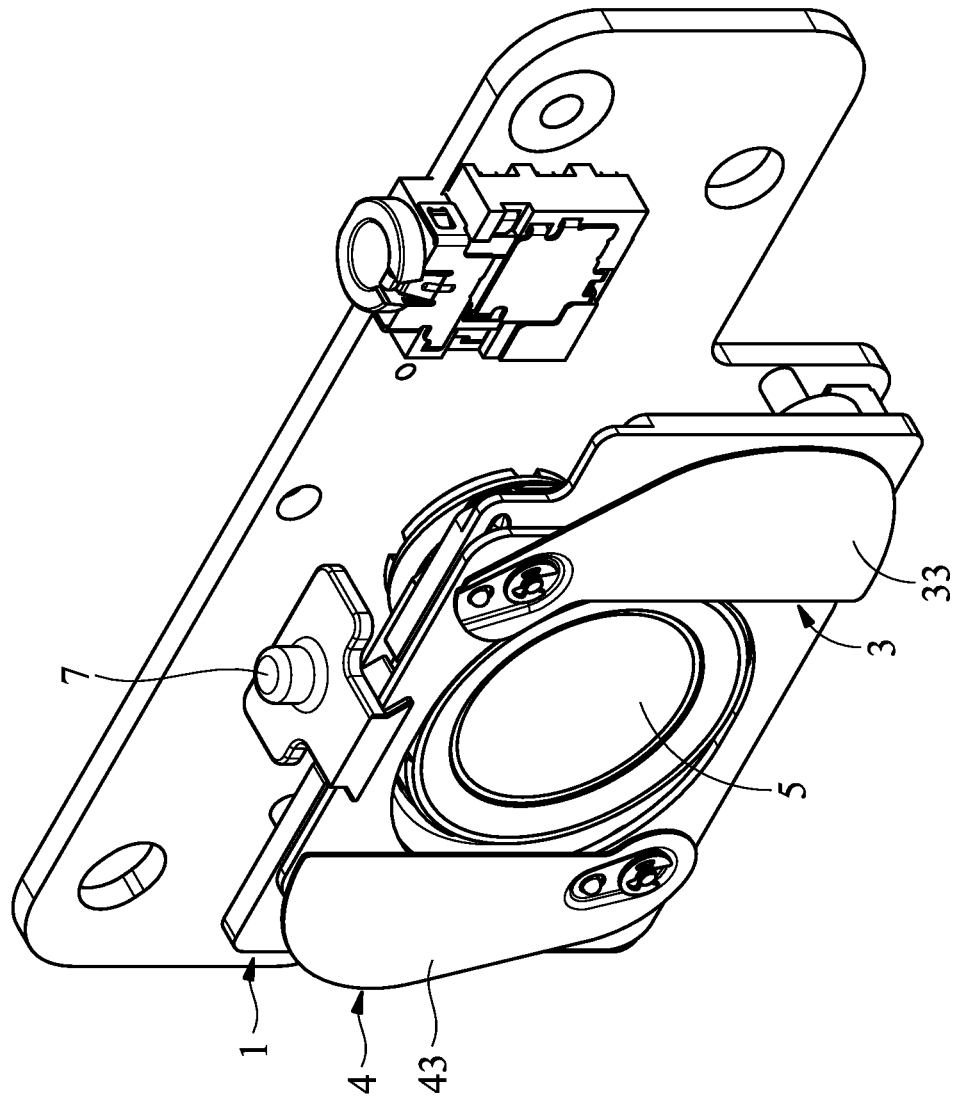
FIG. 3B shows the lens module of the embodiment of the invention, wherein the switch member is in a uncovered state.

With reference to FIGS. 3A and 3B, in one embodiment, the moveable plate 2 is moved along a straight path Y to switch the electronic device E between a covered state (FIG. 3A) and an uncovered state (FIG. 3B) to cover or uncover the lens 5. With reference to FIG. 3A, in the covered state, the first blade 3 is in a first covering orientation, the second blade 4 is in a second covering orientation, and the first blade covering portion 33 and the second blade covering portion 43 cover the lens 5. With reference to FIG. 3B, in the uncovered state, the first blade 3 is in a first uncovered orientation, the second blade 4 is in a second uncovered orientation, and the lens 5 is not covered by the first blade covering portion 33 and the second blade covering portion 43.

In the embodiments of the invention, the electronic device E is switched between the covered state and the uncovered state. The lens module comprised by the electronic device E is thus switched between the covered state and the uncovered state under the same operation.

Utilizing the embodiment of the invention, the moveable plate 2 is capable to be moved along the straight path Y to switch the electronic device E between the covered state and the uncovered state because the first blade pivoting portion 31 is located between the first blade abutting portion 32 and the first blade covering portion 33, and the second blade abutting portion 42 is located between the second blade pivoting portion 41 and the second blade covering portion 43. The structure of the lens module of the embodiment of the invention is simplified, and the inner space in the electronic device is increased. Additionally, the lens module of the embodiment can be switched between the covered state and the uncovered state within small operation space, and is not interfered with by other elements.

With reference to FIG. 2A, in one embodiment, the first moveable plate abutting portion 221 comprises a first post. The second moveable plate abutting portion 222 comprises a second post. The first blade abutting portion 32 comprises a first opening. The second blade abutting portion 42 comprises a second opening. The first post (221) abuts the first opening (32). The second post (222) abuts the second opening (42).

In one embodiment of the invention, the first moveable plate abutting portion 221 is a post, the second moveable plate abutting portion 222 is a post, the first blade abutting portion 32 is an opening, and the second blade abutting portion 42 is an opening. However, the disclosure is not meant to restrict the invention. For example, in another embodiment, the first moveable plate abutting portion can be an opening, the second moveable plate abutting portion can be an opening, the first blade abutting portion can be a post, and the second blade abutting portion can be a post.

With reference to FIG. 2A, in one embodiment, the lens module further comprises a first shaft 37 and a second shaft 47. The mounting board 1 comprises a first mounting board pivoting portion 121 and a second mounting board pivoting portion 122. The moveable plate 2 comprises a first moveable plate hole 231 and a second moveable plate hole 232. The first shaft 37 passes through the first moveable plate hole 231 and connects the first blade pivoting portion 31 to the first mounting board pivoting portion 121. The second shaft 47 passes through the second moveable plate hole 232 and connects the second blade pivoting portion 41 to the second mounting board pivoting portion 122. The disclosure is not meant to restrict the invention. For example, in another embodiment, the first shaft can be integrally formed on the first mounting board pivoting portion, and the second shaft can be integrally formed on the second mounting board pivoting portion.

With reference to FIGS. 2A, 2B, 3A and 3B, when the moveable plate 2 is moved along the straight path Y, the first shaft 37, the first blade pivoting portion 31, the first mounting board pivoting portion 121 are still relative to the mounting board 1, the first moveable plate hole 231 is moved in the straight path Y relative to the first shaft 37, the first moveable plate abutting portion 221 pushes and moves the first blade abutting portion 32 in a straight path Y (rightward of FIG. 2B), and the first blade covering portion 33 is rotated around the first shaft 37 to the first uncovered orientation as shown in FIG. 3B. Similarly, when the moveable plate 2 is moved along the straight path Y, the second shaft 47, the second blade pivoting portion 41, the second mounting board pivoting portion 122 are still relative to the mounting board 1, the second moveable plate hole 232 is moved in the straight path Y relative to the second shaft 47, the second moveable plate abutting portion 222 pushes and moves the second blade abutting portion 42 in a straight path Y (leftward of FIG. 2B), and the second blade covering portion 43 is rotated around the second shaft 47 to the second uncovered orientation as shown in FIG. 3B. In this embodiment, the first blade covering portion 33 and the second blade covering portion 43 totally or partially cover the mounting board opening 11 and the moveable plate opening 21.

Figure 2B:
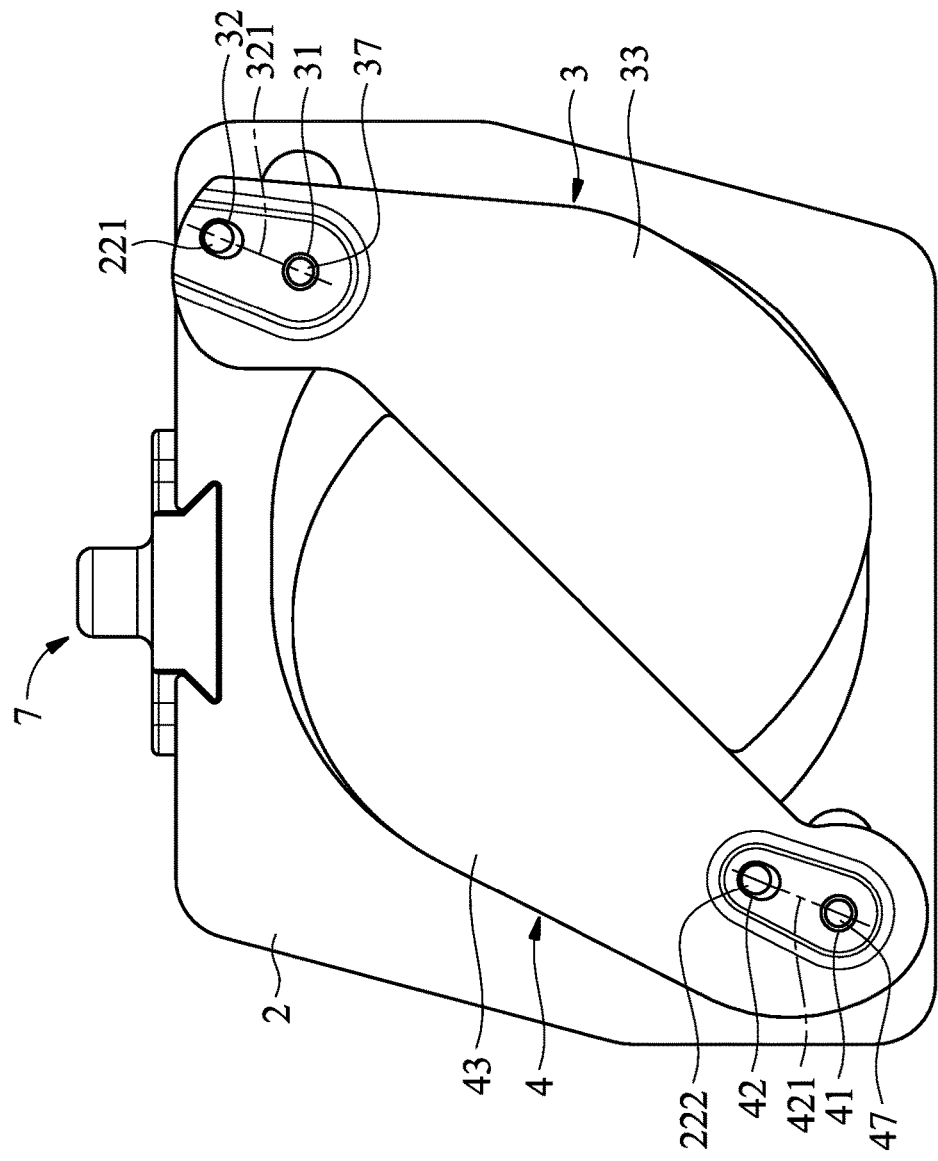
FIG. 2B is a front view of the switch member of the embodiment of the invention.

With reference to FIG. 2B, in one embodiment, the first blade abutting portion (first opening) 32 and the second blade abutting portion (second opening) 42 are oval. In one embodiment, the first blade abutting portion (first opening) 32 comprises a first major axis 321, and an extending line of the first major axis 321 passes through the first shaft 37. The second blade abutting portion (second opening) 42 comprises a second major axis 421, and an extending line of the second major axis 421 passes through the second shaft 47. Therefore, the first moveable plate abutting portion 221 smoothly pushes the first blade abutting portion (first opening) 32, and the second moveable plate abutting portion 222 smoothly pushes the second blade abutting portion (second opening) 42 without sticking. In another embodiment, the extending line of the first major axis 321 may not pass through the first shaft 37, and the extending line of the second major axis 421 may not pass through the second shaft 47. In further another embodiment, the shape of the first opening (32) and the second opening (42) can be modified. The disclosure is not meant to restrict the invention.

With reference to FIG. 2A, in one embodiment, the first mounting board pivoting portion 121 is adapted to slide in the first moveable plate hole 231. The second mounting board pivoting portion 122 is adapted to slide in the second moveable plate hole 232. Therefore, the moveable plate 2 can be stably moved in the straight path Y.

With reference to FIG. 2A, in one embodiment, the mounting board 1 comprises a first restriction rib 131 and a second restriction rib 132. The moveable plate 2 slides between the first restriction rib 131 and the second restriction rib 132. Therefore, the moveable plate 2 can be stably moved in the straight path Y.

With reference to FIG. 2A, in one embodiment, the lens module further comprises a button 7. The button 7 comprises a button connection block 71. The moveable plate 2 comprises a moveable plate notch 24. The button connection block 71 wedges the moveable plate notch 24. By pushing the button 7 along the straight path Y to move the moveable plate 2, the lens module is switched between the covered state and the uncovered state. However, the disclosure is not meant to restrict the invention. For example, in another embodiment, the button 7 can be omitted. The lens module can be switched between the covered state and the uncovered state by directly moving the moveable plate 2.

With reference to FIG. 1, in one embodiment, the mounting board 1 comprises a mounting board notch 14, and the button connection block 71 is moved in the mounting board notch 14.

With reference to FIG. 1, in one embodiment, the electronic device further comprises a first light source unit 81 and a second light source unit 82. The first light source unit 81 and the second light source unit 82 are disposed on the device housing 6. The lens 5, the mounting board 1, the moveable plate 2, the first blade 3 and the second blade 4 are located between the first light source unit 81 and the second light source unit 82.

Figure 4:
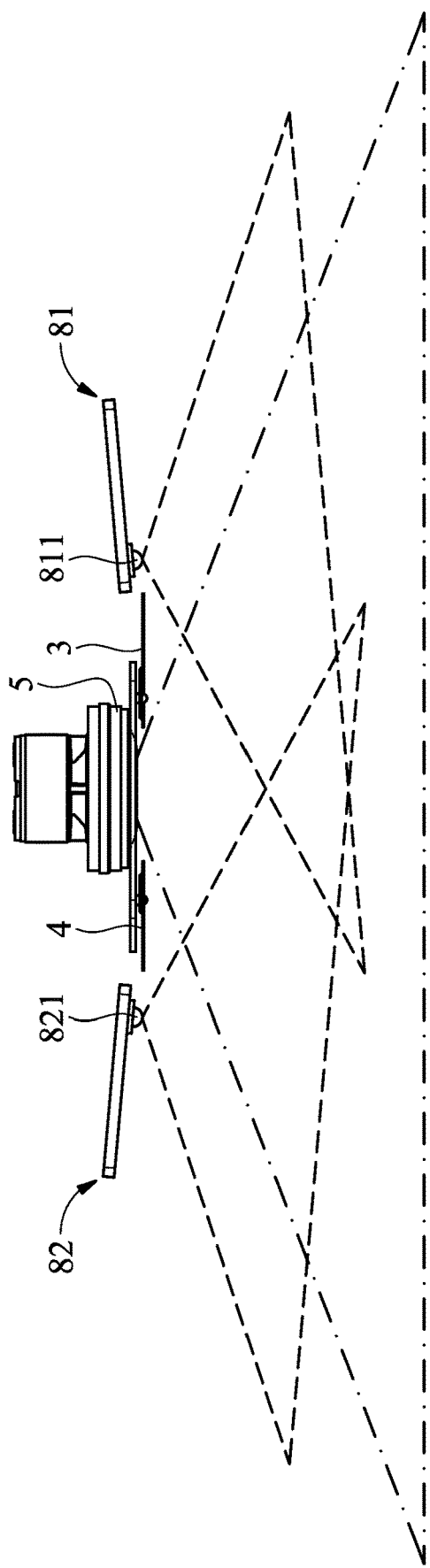
FIG. 4 shows the first blade being located between the first light source element and the lens, and the second blade being located between the second light source element and the lens.

With reference to FIGS. 1 and 4, in one embodiment, the first light source unit 81 comprises at least one first light source element 811. The second light source unit 82 comprises at least one second light source element 821. In the uncovered state, the first blade 3 is located between the first light source element 811 and the lens 5. The second blade 4 is located between the second light source element 821 and the lens 5. With reference to FIG. 4, in this embodiment, the positions of the first blade 3 and the second blade 4 are properly designed. The first blade 3 and the second blade 4 are located out of the light-emitting range of the first light source element 811 and the second light source element 821, which are prevented from hindering the light provided by the first light source element 811 and the second light source element 821. Additionally, in the uncovered state, the first blade 3 and the second blade 4 are located out of the light entering range of the lens 5, and the outer light entering the lens 5 is prevented from being hindered by the first blade 3 and the second blade 4.

In one embodiment, the first light source element 811 and the second light source element 821 can include infrared light-emitting diodes to provide night vision. However, the disclosure is not meant to restrict the invention, the first light source element 811 and the second light source element 821 can provide light with other wavelengths.

Figure 5A:
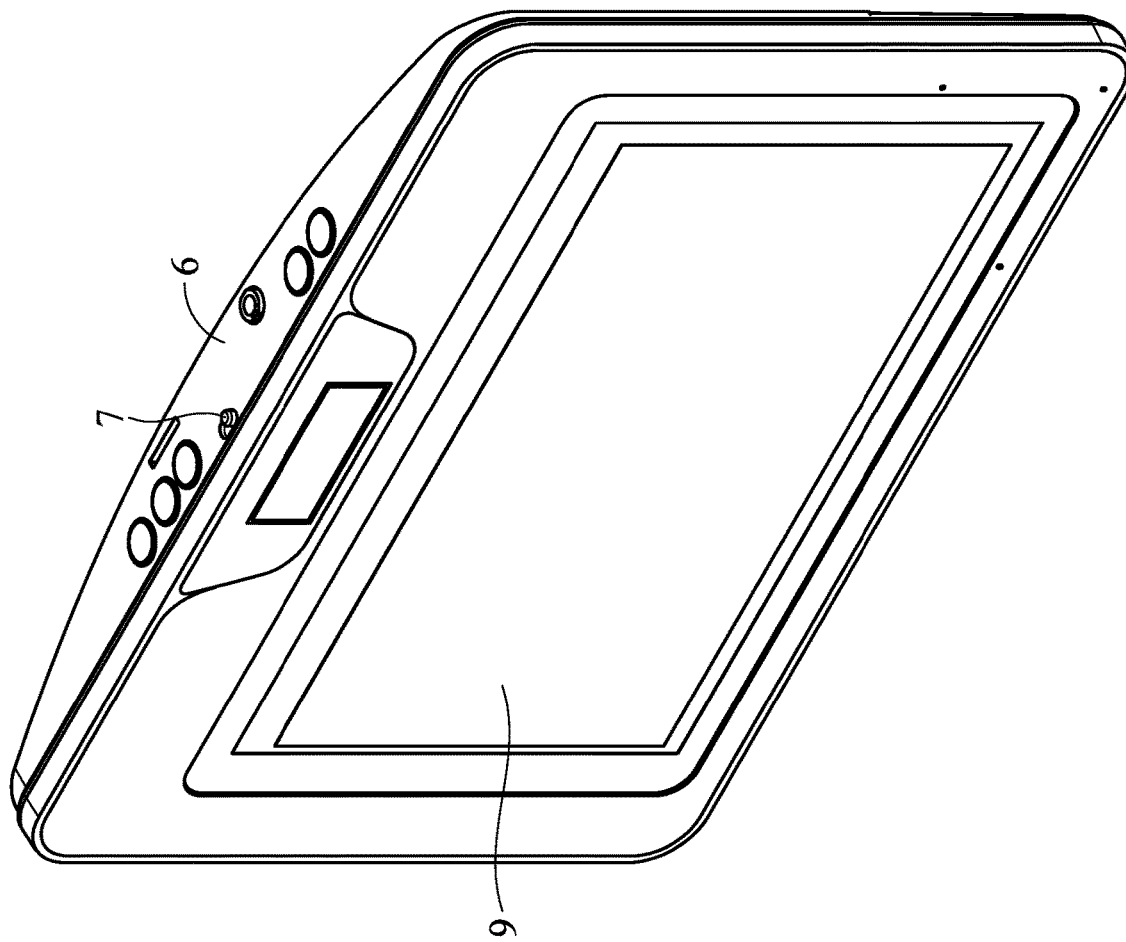
FIG. 5A is an assembled view of the electronic device of the embodiment of the invention, wherein the switch member is in the covered state.
Figure 5B:
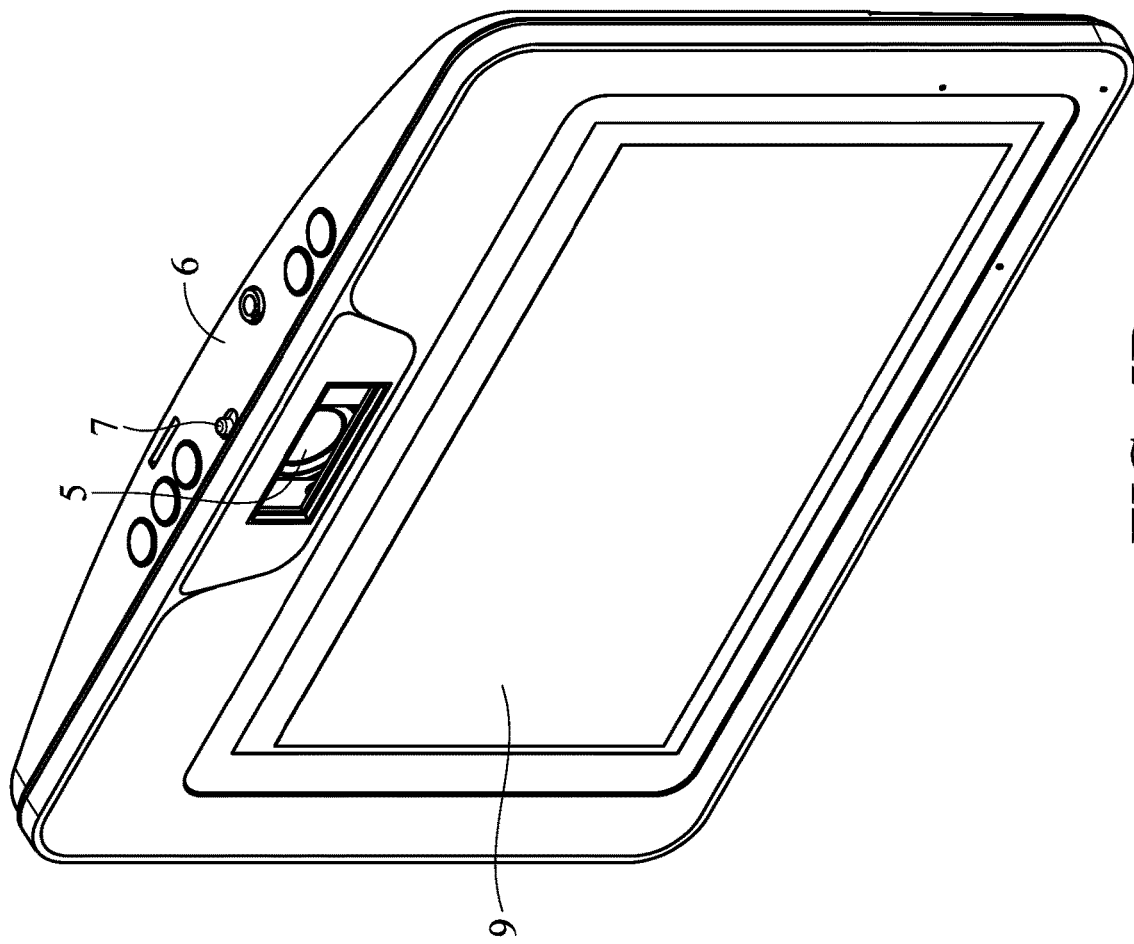
FIG. 5B is the assembled view of the electronic device of the embodiment of the invention, wherein the switch member is in the uncovered state.

With reference to FIGS. 1, 5A and 5B, in one embodiment, the electronic device E further comprises a display 9, wherein the display 9 is disposed on the device housing 6.

Figure 6B:
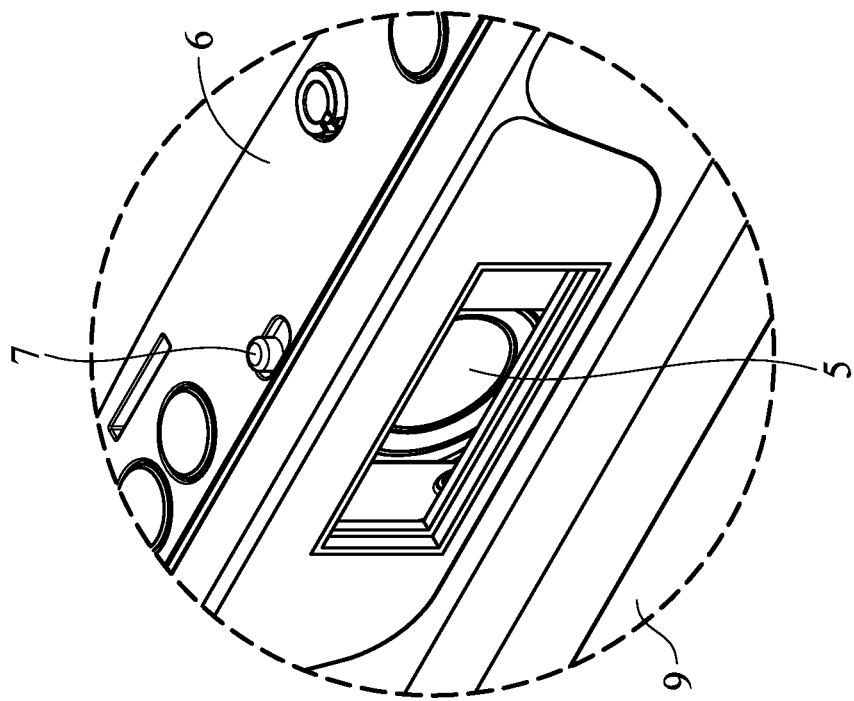
FIG. 6B shows a portion of the electronic device of the embodiment of the invention, wherein the switch member is in the uncovered state.
Figure 6A:
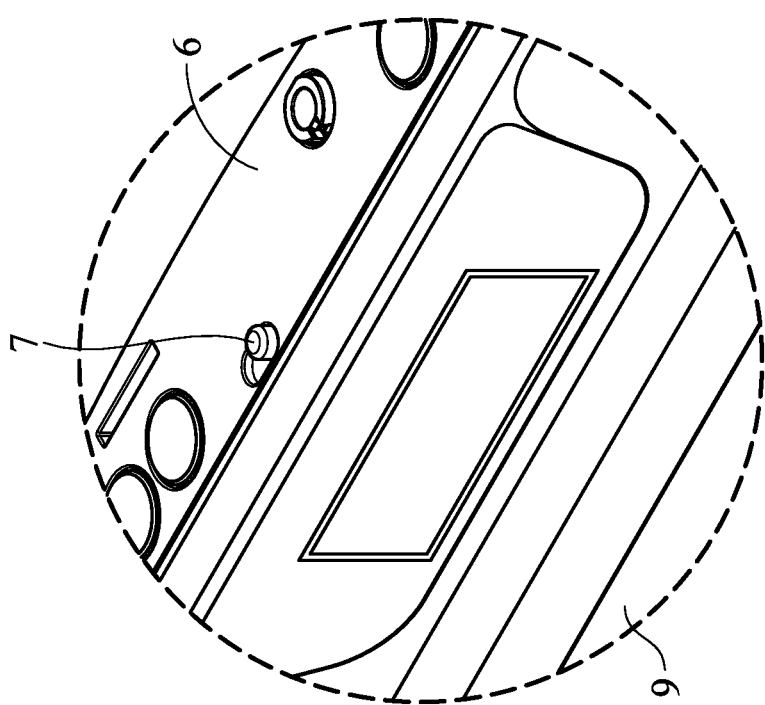
FIG. 6A shows a portion of the electronic device of the embodiment of the invention, wherein the switch member is in the covered state.

With reference to FIGS. 6A and 6B, the button 7 is partially protruding from the device housing 6. By pushing the button 7, the electronic device E is switched between the covered state (FIG. 6A) and the uncovered state (FIG. 6B).

In one embodiment, the switch member can be hung on an object (for example, affixing the mounting board to a housing of the object). In one embodiment, the switch member can be disposed on a socket. The switch member can also be disposed on a fan or a flow path of a computer or a server. The switch member can provide functions such as anti-theft, dustproof, foolproof or preventing heat reflow. The switch member can also temporarily cover items that the user does not want to see.

In one embodiment, the blades can be made by lenses or filters to be utilized in a light machine system to provide functions such as telephoto, wide angle, filter, etc.

In one embodiment, the blades can be made of magnetic materials to be utilized in an automated system to control current direction.

In one embodiment, the switch member can be utilized for sound blocking or audio switching. The blades can be made of soundproof foam or another acoustic material.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens module, comprising:
   a substrate;
   a lens, disposed on the substrate;
   a mounting board, disposed on the substrate, wherein the mounting board comprises a mounting board opening, and the lens corresponds to the mounting board opening;
   a moveable plate, slidably connected to the mounting board, wherein the moveable plate comprises a moveable plate opening, the moveable plate opening corresponds to the lens, and the moveable plate further comprises a first moveable plate abutting portion and a second moveable plate abutting portion;
   a first blade, comprising a first blade pivoting portion, a first blade abutting portion and a first blade covering portion, wherein the first blade covering portion is adapted to cover the lens, the first blade pivoting portion is located between the first blade abutting portion and the first blade covering portion, the first blade pivots on the mounting board via the first blade pivoting portion, and the first moveable plate abutting portion abuts the first blade abutting portion; and
   a second blade, comprising a second blade pivoting portion, a second blade abutting portion and a second blade covering portion, wherein the second blade covering portion is adapted to cover the lens, the second blade abutting portion is located between the second blade pivoting portion and the second blade covering portion, the second blade pivots on the mounting board via the second blade pivoting portion, and the second moveable plate abutting portion abuts the second blade abutting portion.

2. The lens module as claimed in claim 1, wherein the moveable plate is moved along a straight path to switch the lens module between a covered state and an uncovered state, and in the covered state, the first blade is in a first covering orientation, the second blade is in a second covering orientation, the first blade covering portion and the second blade covering portion cover the lens, and in the uncovered state, the first blade is in a first uncovered orientation, the second blade is in a second uncovered orientation, and the lens is not covered by the first blade covering portion and the second blade covering portion.

3. The lens module as claimed in claim 2, wherein the first moveable plate abutting portion comprises a first post, the second moveable plate abutting portion comprises a second post, the first blade abutting portion comprises a first opening, the second blade abutting portion comprises a second opening, the first post abuts the first opening, and the second post abuts the second opening.

4. The lens module as claimed in claim 3, further comprising a first shaft and a second shaft, wherein the mounting board comprises a first mounting board pivoting portion and a second mounting board pivoting portion, the moveable plate comprises a first moveable plate hole and a second moveable plate hole, the first shaft passes through the first moveable plate hole and connects the first blade pivoting portion to the first mounting board pivoting portion, and the second shaft passes through the second moveable plate hole and connects the second blade pivoting portion to the second mounting board pivoting portion.

5. The lens module as claimed in claim 4, wherein the first mounting board pivoting portion is adapted to slide in the first moveable plate hole, and the second mounting board pivoting portion is adapted to slide in the second moveable plate hole.

6. The lens module as claimed in claim 2, wherein the mounting board comprises a first restriction rib and a second restriction rib, and the moveable plate slides between the first restriction rib and the second restriction rib.

7. The lens module as claimed in claim 2, further comprising a button, wherein the button comprises a button connection block, the moveable plate comprises a moveable plate notch, the button connection block wedges the moveable plate notch, and by pushing the button along the straight path to move the moveable plate, the lens module is switched between the covered state and the uncovered state.

8. The lens module as claimed in claim 7, wherein the mounting board comprises a mounting board notch, and the button connection block is moved in the mounting board notch.

9. An electronic device, comprising:
   a device housing;
   a lens, disposed on the device housing;
   a mounting board, disposed on the device housing, wherein the mounting board comprises a mounting board opening, and the lens corresponds to the mounting board opening;
   a moveable plate, slidably connected to the mounting board, wherein the moveable plate comprises a moveable plate opening, the moveable plate opening corresponds to the lens, and the moveable plate further comprises a first moveable plate abutting portion and a second moveable plate abutting portion;

a first blade, comprising a first blade pivoting portion, a first blade abutting portion and a first blade covering portion, wherein the first blade covering portion is adapted to cover the lens, the first blade pivoting portion is located between the first blade abutting portion and the first blade covering portion, the first blade pivots on the mounting board via the first blade pivoting portion, and the first moveable plate abutting portion abuts the first blade abutting portion; and a second blade, comprising a second blade pivoting portion, a second blade abutting portion and a second blade covering portion, wherein the second blade covering portion is adapted to cover the lens, the second blade abutting portion is located between the second blade pivoting portion and the second blade covering portion, the second blade pivots on the mounting board via the second blade pivoting portion, and the second moveable plate abutting portion abuts the second blade abutting portion.

10. The electronic device as claimed in claim 9, further comprising a first light source unit and a second light source unit, the first light source unit and the second light source unit are disposed on the device housing, and the lens, the mounting board, the moveable plate, the first blade and the second blade are located between the first light source unit and the second light source unit.

11. The electronic device as claimed in claim 10, wherein the moveable plate is moved along a straight path to switch the electronic device between a covered state and an uncovered state relative to the lens, and in the covered state, the first blade is in a first covering orientation, the second blade is in a second covering orientation, the first blade covering portion and the second blade covering portion cover the lens, and in the uncovered state, the first blade is in a first uncovered orientation, the second blade is in a second uncovered orientation, and the lens is not covered by the first blade covering portion and the second blade covering portion.

12. The electronic device as claimed in claim 11, wherein the first light source unit comprises at least one first light source element, the second light source unit comprises at least one second light source element, and in the uncovered state, the first blade is located between the first light source element and the lens, and the second blade is located between the second light source element and the lens.

13. The electronic device as claimed in claim 12, further comprising a button, wherein the button comprises a button connection block, the moveable plate comprises a moveable plate notch, the button connection block wedges the moveable plate notch, and by pushing the button along the straight path to move the moveable plate, the electronic device is switched between the covered state and the uncovered state, and the button is partially protruding out of the device housing.

14. The electronic device as claimed in claim 13, further comprising a display, wherein the display is disposed on the device housing.

15. A switch member, comprising:
a mounting board, wherein the mounting board comprises a mounting board opening;
a moveable plate, slidably connected to the mounting board, wherein the moveable plate comprises a moveable plate opening, the moveable plate opening corresponds to the mounting board opening, and the moveable plate further comprises a first moveable plate abutting portion and a second moveable plate abutting portion;

a first blade, comprising a first blade pivoting portion, a first blade abutting portion and a first blade covering portion, wherein the first blade covering portion is adapted to cover the mounting board opening and the moveable plate opening, the first blade pivoting portion is located between the first blade abutting portion and the first blade covering portion, the first blade pivots on the mounting board via the first blade pivoting portion, and the first moveable plate abutting portion abuts the first blade abutting portion; and a second blade, comprising a second blade pivoting portion, a second blade abutting portion and a second blade covering portion, wherein the second blade covering portion is adapted to cover the mounting board opening and the moveable plate opening, the second blade abutting portion is located between the second blade pivoting portion and the second blade covering portion, the second blade pivots on the mounting board via the second blade pivoting portion, and the second moveable plate abutting portion abuts the second blade abutting portion.

16. The switch member as claimed in claim 15, wherein the moveable plate is moved along a straight path to switch the switch member between a covered state and an uncovered state, and in the covered state, the first blade is in a first covering orientation, the second blade is in a second covering orientation, the first blade covering portion and the second blade covering portion cover the mounting board opening and the moveable plate opening, and in the uncovered state, the first blade is in a first uncovered orientation, the second blade is in a second uncovered orientation, and the mounting board opening and the moveable plate opening are not covered by the first blade covering portion and the second blade covering portion.

17. The switch member as claimed in claim 16, wherein the first moveable plate abutting portion comprises a first post, the second moveable plate abutting portion comprises a second post, the first blade abutting portion comprises a first opening, the second blade abutting portion comprises a second opening, the first post abuts the first opening, and the second post abuts the second opening.

18. The switch member as claimed in claim 17, further comprising a first shaft and a second shaft, wherein the mounting board comprises a first mounting board pivoting portion and a second mounting board pivoting portion, the moveable plate comprises a first moveable plate hole and a second moveable plate hole, the first shaft passes through the first moveable plate hole and connects the first blade pivoting portion to the first mounting board pivoting portion, and the second shaft passes through the second moveable plate hole and connects the second blade pivoting portion to the second mounting board pivoting portion.

19. The switch member as claimed in claim 18, wherein the first opening and the second opening are oval, the first opening comprises a first major axis, an extending line of the first major axis passes through the first shaft, the second opening comprises a second major axis, an extending line of the second major axis passes through the second shaft.

20. The switch member as claimed in claim 15, wherein the first blade and the second blade are comprised of plastic, metal, a lens, an optical filter, a magnetic material or an acoustic material.

* * * * *